United States Patent
Tokizawa (10) Patent No.: US 8,427,026 B2
(45) Date of Patent: Apr. 23, 2013

(54) STATOR CORE FOR ROTATING ELECTRICAL MACHINE

(75) Inventor: Takashi Tokizawa, Nisshin (JP)

(73) Assignee: Denso Corporation, Kariya (JP)

( * ) Notice: Subject to any disclaimer, the term of this patent is extended or adjusted under 35 U.S.C. 154(b) by 577 days.

(21) Appl. No.: 12/285,103

(22) Filed: Sep. 29, 2008

(65) Prior Publication Data

US 2009/0083965 A1 Apr. 2, 2009

(30) Foreign Application Priority Data

Sep. 27, 2007 (JP) ................................. 2007-250654

(51) Int. Cl.
*H02K 1/06* (2006.01)

(52) U.S. Cl.
USPC .................................................. 310/216.041

(58) Field of Classification Search ... 310/216.041–216.044, 216.054–216.056, 310/216.049; 72/130
See application file for complete search history.

(56) References Cited

U.S. PATENT DOCUMENTS

| | | | | |
|---|---|---|---|---|
| 1,286,013 A | * | 11/1918 | Jeannin | 310/216.048 |
| 2,169,617 A | * | 8/1939 | Schmidt | 310/216.004 |
| 4,061,098 A | | 12/1977 | Horie et al. | |
| 4,193,281 A | * | 3/1980 | Kulikov et al. | 72/130 |
| 4,403,401 A | * | 9/1983 | Rosenberry | 29/596 |
| 4,445,353 A | * | 5/1984 | Taleff et al. | 72/136 |
| 4,747,288 A | * | 5/1988 | Fritzsche | 72/130 |
| 4,940,913 A | * | 7/1990 | Fritzsche | 310/216.042 |
| 6,308,549 B1 | * | 10/2001 | Tokizawa et al. | 72/136 |
| 7,315,104 B2 | * | 1/2008 | Koshizaka et al. | 310/216.043 |
| 2009/0083964 A1 | * | 4/2009 | Tokizawa | 29/596 |
| 2009/0083965 A1 | * | 4/2009 | Tokizawa | 29/596 |

FOREIGN PATENT DOCUMENTS

| | | |
|---|---|---|
| JP | B2-53-008312 | 3/1978 |
| JP | B2-55-032454 | 8/1980 |
| JP | B2-55-039415 | 10/1980 |
| JP | 56022559 | * 3/1981 |
| JP | A-57-187116 | 11/1982 |
| JP | B2-06-065414 | 8/1994 |
| JP | 08080014 | * 3/1996 |
| JP | B1-2934960 | 8/1999 |
| JP | B2-3539626 | 7/2004 |
| JP | B2-3631523 | 3/2005 |
| JP | A-2005-185014 | 7/2005 |
| JP | A-2006-246586 | 9/2006 |

\* cited by examiner

*Primary Examiner* — Nguyen N Hanh
(74) *Attorney, Agent, or Firm* — Oliff & Berridge, PLC

(57) ABSTRACT

A stator core manufacturing method has a winding process including an L-bending process in which an outer edge of a strip of steel sheet is bent at an angle to a general plane of the strip, an edgewise-bending process in which the outer edge of the strip is bent edgewise into an arc, and a roll-bending process in which the outer edge of the strip is bent into a curve warping in a thickness direction of the strip, wherein the L-bending process, the edgewise-bending process and the roll-bending process are performed successively in a predetermined sequence before the strip is wound in a spiral fashion so as to form a generally cylindrical core.

9 Claims, 6 Drawing Sheets

FIG. 4(c) L-BENDING

FIG. 4(d) EDGEWISE-BENDING

FIG. 4(e) ROLL-BENDING

STATOR CORE FOR ROTATING ELECTRICAL MACHINE

CROSS REFERENCE TO RELATED APPLICATION

The present application is based on and claims priority from Japanese Patent Application No. 2007-250654, filed Sep. 27, 2007, the content of which is incorporated herein by reference.

BACKGROUND OF THE INVENTION

1. Field of the Invention

The present invention relates to a stator core for a rotating electrical machine and a method of manufacturing the same.

2. Description of the Related Art

As a stator core for rotating electrical machines, a so-called "helical stator core" has been used heretofore. As shown, for example, in Japanese Patent Laid-open Publication (JP-A) No. 2001-054261, the helical stator core (hereinafter referred to for brevity as "stator core") is formed by helically winding a strip of steel sheet press-formed with magnetic pole teeth while, at the same time, stacking the helically wound portions or turns into a cylindrical shape. An outer edge portion of the strip, which forms a core-back part of the stator core, is thinned into a tapered shape and extended in the longitudinal direction by a pair of forming rollers to provide a longer circumferential length for facilitating winding of the strip.

The helically wound portions or turns of the strip are brought together by axial compaction to thereby form a laminated stator core. The turns or layers of the laminated stator core are aligned in the radial direction such that an amount of radial displacement between the layers is within an allowable range. The thus aligned layers of the laminated stator are welded at respective outer edges thereof to thereby keep the interlayer displacement from becoming greater. The laminated stator core is then subjected to a finishing process in which, as shown for example in Japanese Patent Laid-open Publication (JP-A) No. 2006-246586, the laminated stator core is shaped by ironing into a desired form having a desired level of dimensional accuracy in terms of the roundness of an outer peripheral surface, concentricity of the outer peripheral surface relative to an inner peripheral surface, and perpendicularity of the outer peripheral sure.

According to the conventional winding process described above, the steel sheet strip having press-formed magnetic pole teeth is bent edgewise into an arc with a toothed edge of the strip being radially inside and a core-back side edge opposite the toothed edge being radially outside. During such edgewise bending, an outer edge portion of the core-back side edge is thinned into a tapered form and extended in the longitudinal direction. Since the core-back side becomes thinner as it approaches the outer edge thereof, a crack may occur at thus thinned or tapered core-back side.

To deal with this problem, a separate pre-winding process is employed in which the core-back side of a steel sheet strip is thinned and extended in the longitudinal direction by means of forming rollers to provide an increased circumferential length for winding and cause a plastic flow of the material in a feed direction of the strip during rolling with the result that the strip bends edgewise in a width direction to assume a bent shape, which can facilitate a subsequent helical winding operation.

However, as for the thinning by the forming rollers and the edgewise bending, the current tendency is to use a thinner steel sheet so as to lower eddy-current loss (iron loss) while allowing widening of a core-back portion to deal with a high-power trend of the rotating electrical machines in recent years. Thus, the thinning work necessarily becomes heavy-load work and requires a large working machine making it more difficult to meet power saving demands. Furthermore, excessive thickness reduction may cause a core-back cracking problem dug the winding process.

As the thickness reduction of core-back part increases, a wedge-shaped gap or clearance produced between the outer edge portions of the thinned core-back parts of two adjacent layers of the laminated core becomes large. Due to the presence of a large wedge-shaped interlayer clearance, the ironing process achieved for shaping an outer peripheral surface of the core into a desired form will encounter a problem that the outer edge portions of the adjacent layers of the core cannot be securely restrained despite being applied with a proper ironing load or pressure for an appropriate ironing depth and tend to weaken or absorb the ironing pressure via the interlayer clearance. In the case where the outer edge portions of the layers are largely displaced from one another in the radial direction, the ironing operation becomes sluggish and causes distortion of the outer edge portions, leading to enlargement of the interlayer clearance.

The enlarged interlayer clearance and the crack at the core-back part, which are caused by intensified thinning of the core-back part, deteriorate the aesthetic appearance of the core, will cause rust on the core, and increase magnetic resistance and hinder smooth passage of magnetic fluxes and thereby lower the output power of the rotating electrical machine. Furthermore, the interlayer clearance might lower a clamp-holding force by deflecting an axial component thereof when the stator core and front and rear frames are clamped in sandwiched relation by means of through-bolts.

To cope with the growing tendency to increase the power and efficiency of the rotating electrical machines, the stator core needs to be larger in size and diameter and able to accommodate conductors within slots at a higher density. To meet these requirements, the thickness of a steel sheet should be reduced to thereby ensure that the stator core has an increased number of slots, a smaller slot pitch, a larger core-back part, and a lower iron loss.

As described above, the use of a thin steel sheet would cause various problems in conjunction with the winding process during the manufacture of a cylindrical stator core, such as a difficulty in obtaining a large rolling reduction when an outer edge portion of the core-back part is thinned by rolling, an enlarged interlayer clearance caused at the outer edge portion of the core due to an increase in the rolling reduction, and a crack occurring at the thinned or rolled core-back part of the core. Furthermore, the ironing process also encounters difficulties that smooth ironing work cannot be achieved and the interlayer clearance is enlarged by the ironing process.

SUMMARY OF THE INVENTION

With the foregoing difficulties in review, a principal object of the present invention is to provide a method of manufacturing a stator core, which is capable of preventing the occurrence of cracks at a core-back part during a winding operation and also suppressing the generation of an interlayer clearance in a helically wound stator core.

Another object of the present invention is to provide a stator core of the helical type, which has excellent strength properties.

According to one aspect of the present invention, there is provided a method of manufacturing a stator core for a rotating electrical machine, comprising: a press-working process in which a strip of steel plate is press-worked to have a plurality of magnetic pole teeth formed along a first edge thereof a winding process in which the press-worked strip is thinned at a second edge thereof opposite the toothed first edge and wound in a spiral fashion with the toothed first edge being radially inside so as to form a generally cylindrical core having a helical plurality of turns; a welding process in which the helical turns of the cylindrical core are aligned in radial and circumferential directions and the aligned helical turns are welded together at the second edge of the strip; and a fishing process in which an outer peripheral surface of the cylindrical core, which is formed jointly by outer peripheral surfaces of the welded turns of the cylindrical core, is shaped by ironing into a predetermined configuration, wherein the winding process comprises: an L-bending process in which the second edge of the strip is bent at an angle to a general plane of the strip; an edgewise-bending process in which the second edge of the strip is bent edgewise into an arc with the toothed first edge of the strip being radially inside; and a roll-bending process in which the second edge of the strip is bent into a curve warping in a thickness direction of the strip, and wherein the L-bending process, the edgewise-bending process and the roll-bending process are performed successively in a predetermined sequence before the strip is wound in a spiral fashion with the toothed first edge of the strip being radially inside to thereby form the cylindrical core.

With the outer edge portion of the strip bent at an angle to the general plane of the strip, the core is allowed to have a smaller outside diameter and a circumferential distortion of the outer edge portion becomes smaller than that of the flat unbent outer edge portion of the conventional core with the result that a crack at an outer periphery of the core is unlikely to occur. Furthermore, since the bending of the strip in a thickness direction thereof requires a small bending area and involves a small working distortion as compared to the bending of the strip in a direction along the surface, combined use of such bending in the thickness direction is able to reduce a circumferential distortion of the core to a level much smaller than that of the conventional core, allowing for a rolling operation performed on the strip outer edge portion with a small rolling reduction. By thus limiting the rolling reduction, it is possible to suppress the occurrence of an interlayer gap or clearance at the outer edge portion of the laminated core.

In one preferred form of the present invention, the L-bending process, the edgewise-bending process and the roll-bending process are performed in the named order. As an alternative, the edgewise-bending process may be performed before the L-bending process and the roll-bending process, and the L-bending process is performed between the edgewise-bending process and the roll-bending process.

Preferably, the L-bending process is carried out by rolling the second edge of the strip by a pair of rollers, one of the pair of rollers being a tapered roller and the other being a reverse tapered roller, the tapered roller and the reverse tapered roller having the same cone angle and defining therebetween a uniform gap, the gap being inclined at an angle to a plane parallel to axes of the tapered and reverse tapered rollers.

With this arrangement, the L-bending process can be achieved easily and continuously with a simple working apparatus and at a high working speed (productivity). With the outer edge thus bent or tilted, the strip is unlikely to distort in the circumferential direction as opposed to the conventional strip having an unbent outer edge. This will ensure that in the next following edgewise-bending process, the strip can be bent edgewise without causing a crack at the outer edge. The bending or tilting of the outer edge by means of the rollers is able to reduce a rolling reduction at the subsequent edgewise-bending process.

Preferably, the edgewise-bending process is carried out by rolling the second edge of the strip by a pair of rollers, the pair of rollers defining therebetween a wedge-shaped gap having a varying width reducing gradually as it approaches an end extremity of the second edge of the strip. One of the pair of rollers is a tapered roller and the other is a reverse tapered roller, the tapered roller having a cone angle larger than a cone angle of the reverse tapered roller, the wedge-shaped gap defined between the tapered roller and the reverse tapered roller being inclined at an angle to a plane parallel to axes of the tapered and reverse tapered rollers.

With this arrangement, thinning of the strip outer edge can be achieved easily and continuously with a simple working apparatus and at a high working speed (productivity). Furthermore, by virtue of a plastic flow of the material generated during the rolling operation in the feed direction of the strip, the strip is likely to undergo edgewise deformation or bending, which will facilitate helical winding of the strip.

Preferably, the roll-bending process is carried out by rolling the second edge of the strip by a plurality of pairs of rollers arrayed in a row in a longitudinal direction of the strip, the arrayed plurality of pairs of rollers being offset from one another such that the amount of offset between two adjacent pairs of rollers of the arrayed plurality of rollers becomes greater in an advancing direction of the strip, one of each pair of rollers of the plurality of rollers being a tapered roller and the other being a reverse tapered roller, the tapered roller having a cone angle larger than a cone angle of the reverse tapered roller, the tapered roller and the reverse tapered roller defining therebetween a wedge-shaped gap having a varying width reducing gradually as it approaches an end extremity of the second edge of the strip, the wedge-shaped gap being inclined at an angle to a plane parallel to axes of the tapered and reverse tapered rollers.

With this arrangement, bending of the strip outer edge in the thickness direction can be achieved easily and continuously by a simple working apparatus and at a high working speed (productivity). With this bending, the strip, as it is wound in a spiral fashion in the subsequent winding process, is readily able to assume a helical shape like a screw having a predetermined lead. Thus, the helical winding process can be achieved smoothly without causing interference between two adjacent turns of the strip.

According to another aspect of the present invention, there is provided a stator core for a rotating electrical machine, comprising: a generally cylindrical core having a helical plurality of turns formed in a strip of steel sheet having a plurality of spaced magnetic pole teeth press-formed along a first edge thereof wherein a second edge of the strip opposite the toothed first edge is inclined at an angle to a plane normal to an axis of the cylindrical core, the second edge of the strip being bent edgewise into an arc with the toothed first edge of the strip being radially inside, and the second edge of the strip being bent into a curvature warping in a thickness direction of the strip. The second edge of the strip is free from cracks.

With the stator core thus arranged, the generation of an interlayer clearance (i.e., a clearance between two adjacent helical turns in the strip) is completely suppressed. The stator core free of interlayer clearance does not add to magnetic resistance and guarantees good permeability to magnetic flux, thus preventing power reduction of the rotating electrical machine. As for the strength properties, there is no risk of lowering the clamp-holding force at the core-back part of the stator core when the stator core and front and rear frames are clamped in sandwiched relation by through-bolts. Furthermore, the outer peripheral surface of the core, which is formed by the crack-free second edges of the strip, is free from cracks and this will increase the strength of the core.

BRIEF DESCRIPTION OF THE DRAWINGS

Other objects and features of the present invention will become more readily apparent from the following detailed description of the preferred embodiment taken in conjunction with the accompanying drawings in which.

DETAILED DESCRIPTION OF THE PREFERRED EMBODIMENT

Referring now to the drawings, a description will be given hereinbelow of a preferred embodiment of the present invention, in which a stator core for a rotating electrical machine and a method of manufacturing the stator core according to the present invention are applied to an alternator for a vehicle.

Figure 1A:
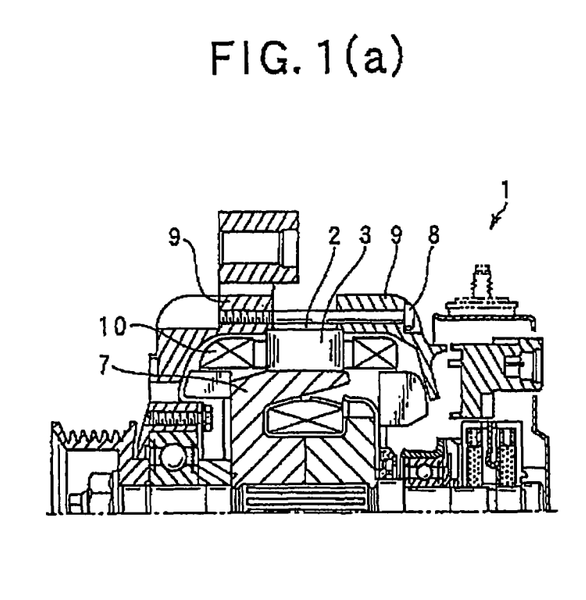
FIG. 1(a) is a cross-sectional view showing an upper half of a vehicle alternator in which a stator core according to the present invention is incorporated.
Figure 1B:
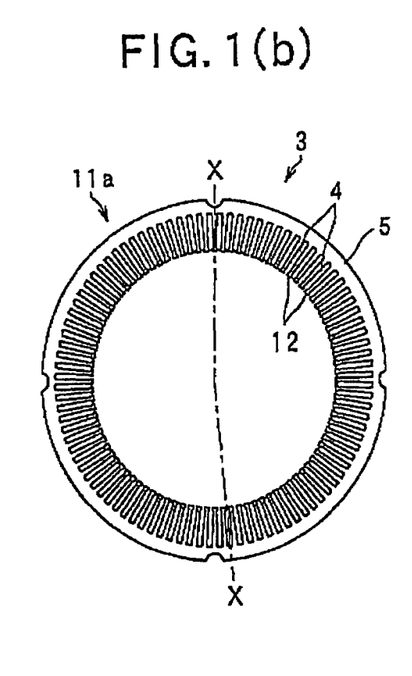
FIG. 1(b) is a plan view of the stator core.
Figure 1C:
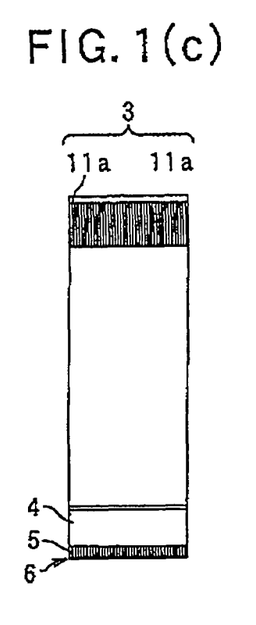
FIG. 1(c) is a cross-sectional view taken along line X-X of FIG. 1(b)

As shown in FIGS. 1(a) to 1(c), a stator core (laminated core) 3 includes a number of ring-like steel sheets 11a (FIG. 1(c)) layered into a ring-like solid. Each of the ring-like steel sheets 11a has magnetic pole teeth 12 (FIG. 1(b)) formed at regular intervals along an inner peripheral edge thereof, slots 4 each defined between two adjacent ones of the teeth 14, a core-back part 5 extending along an outer peripheral edge of the ring-like steel sheet 11a and supporting the teeth 12 at regular intervals. The core-back part 6 has an outer peripheral portion 6 (FIG. 1(c)), which is finished into a predetermined shape as will be described later. In a precise sense, the ring-like steel sheets 11a are formed by a helical plurality of turns formed in a strip 11 of steel sheet having a plurality of regularly spaced magnetic pole teeth 12 formed along one edge (first edge) thereof. The core-back part 5 is formed along the other edge (second edge) of the strip 11 opposite the toothed first edge of the strip 11. The outer peripheral portion 6 of the core-back part 5 will be hereinafter referred to as "strip outer edge portion".

As shown in FIG. 1(a), a stator winding 10 is mounted on the stator core 3 via the slots 4 so as to complete a stator 2. A rotor 7 serving as a field winding is rotatably mounted in the stator 2. The stator 2 and the rotor 7 thus assembled together form the vehicle alternator 1. The stator core 3 is firmly held between and secured to front and rear frames 9 by means of a plurality of through-bolts 8 (one being shown in FIG. 1(a)). The stator core 3 serves as an armature.

Figure 2:
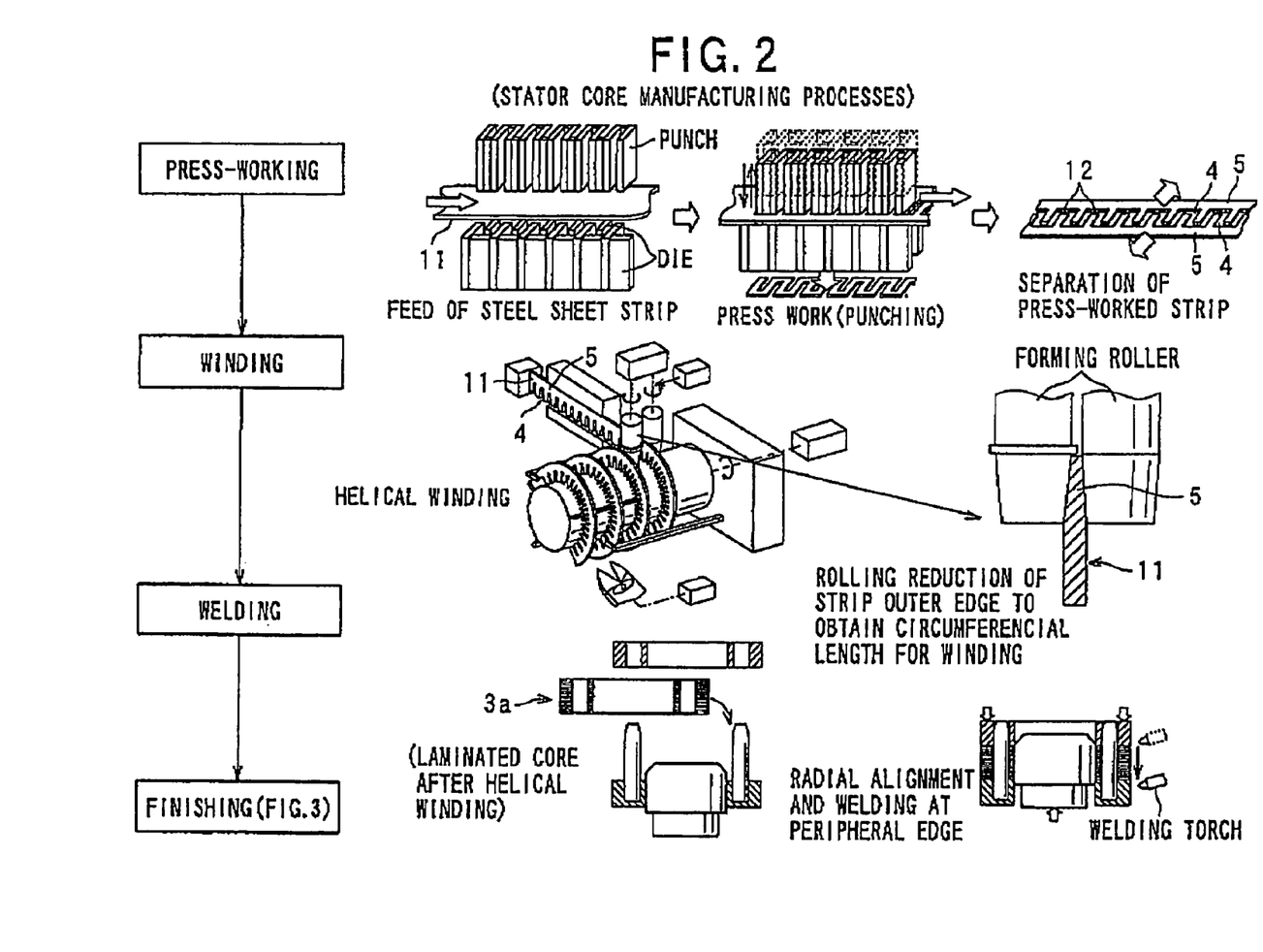
FIG. 2 is a view showing a manufacturing method for the stator core according to the invention with working processes arranged in sequential order.

FIG. 2 shows four working processes generally used in combination in a manufacturing method for the stator core 3. Theses processes are (1) a press-working process in which magnetic pole teeth 12 are press-formed in a strip 11 of steel sheet to thereby form slots 4 defined between the adjacent teeth 14 along one edge (first edge) of the strip 11 and a core-back part 5 extending along the other edge (second edge) of the strip 11, (2) a winding process in which the press-worked strip 11 is wound into a spiral with the toothed edge of the strip 11 being radially inside while a strip outer edge portion 6 of the core-back part 5 is thinned by a pair of forming rollers to thereby extend the strip outer edge portion in a longitudinal direction to such an extent to provide an increased circumferential length for facilitating helical winding of the strip 11 so as to form a generally cylindrical core (laminated core) 3a having a helical plurality of turns in the strip 11, (3) a welding process in which the helical turns of the cylindrical core 3a are aligned in radial and circumferential directions through fine adjustment so that an amount of radial displacement (or misalignment) of the helical turns is kept within an allowable range and the aligned turns are welded at the strip outer edge portion 6 to thereby keep the radial misalignment of the helical turns from increasing, and (4) a finishing process in which an outer peripheral surface of the cylindrical core 3a, which is formed jointly by outer peripheral surfaces of the welded turns of the cylindrical core 3a, is shaped by ironing into a desired form with desired dimensional accuracies such as roundness, concentricity with respect to an inner peripheral surface of the cylindrical core 13, and perpendicularity. A finished stator core 3 is thus produced.

The finishing process achieved as a final working process is an ironing process through which the laminated core 3a obtained after the welding process is shaped into a stator core 3 having desired final shape and dimensions. The ironing process has a series of working steps as will be described below with reference to FIGS. 3(a) to 3(e).

Figure 3A:
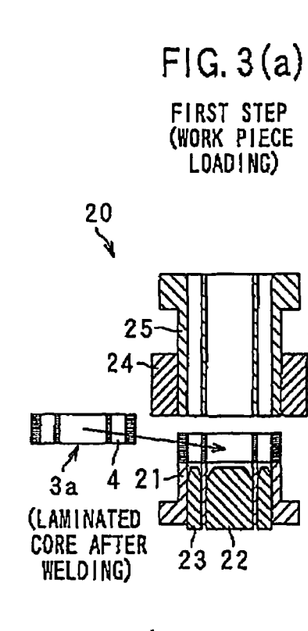
FIGS. 3(a) to 3(e) are views showing a sequence of operations performed to carry out a finishing process according to the stator core manufacturing method of the present invention.

A shown in FIG. 3(a), an ironing apparatus 20 generally comprises a cylindrical support 21 for supporting thereon a workpiece (laminated core 3a), an inside-diameter shaping mandrel 22 received in the cylindrical support 21 for shaping an inner peripheral surface of the laminated core 3a, a slot alignment mandrel 23 for shaping the slots 4 of the laminated core 3a, an outside-dieter ironing ring 24 for shaping by ironing an outer peripheral surface of the laminated core 3a, a cylindrical presser member 25 for pressing the laminated core 3a against the support 21, and a drive means such as a hydraulic press (not shown) for driving the components 21-25 of the ironing apparatus 20.

A first step of the finishing process is a workpiece loading step (FIG. 3(a)) in which the laminated core 3a obtained after the welding process is loaded or placed on an upper surface of the cylindrical support 21 so that the laminated core 3a is concentric to the cylindrical support 21. The cylindrical support 21 is fixed in position and has an outside diameter slightly smaller than an outside diameter of the laminated core 3a.

Figure 3B:
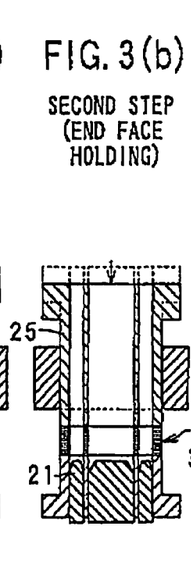

A second step of the finishing process is an end face holding step (FIG. 3(b)) in which the cylindrical presser member 26 is driven by the non-illustrated drive means to move downward and comes into abutment with an upper end face of the laminated core 3a. The cylindrical presser member 25 is disposed coaxially with the cylindrical support 21 and has an outside diameter slightly smaller than the outside diameter of the laminated core 3a. The outside diameter of the cylindrical presser member 25 may be either equal to, or alternately different from the outside diameter of the cylindrical support 21 provided that a positive ironing process can be achieved.

Figure 3C:
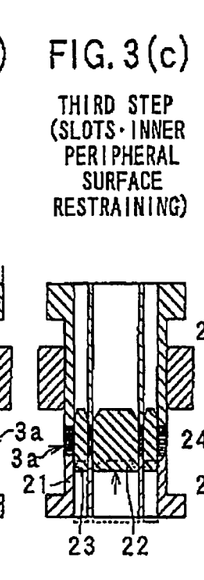

A third step of the finishing process is a slot and inner peripheral surface restraining step (FIG. 3(c)) in which the slot alignment mandrel 23 is driven by the non-illustrated drive means to move upward and, subsequently, the inside-diameter shaping mandrel 22 is driven to move upward. The slot alignment mandrel 23 and the inn de-diameter shaping mandrel 22 project into the slots 4 (FIG. 3(a)) and an axial hole (not designated), respectively, of the laminated stator 3a from a lower end thereof. In this instance, the slot alignment mandrel 23 corrects a slight positional displacement in either radial or circumferential direction of the toothed inner edges of the helical turns in the strip 11 that may occur within each slot 4 of the laminated core 3a, thereby ensuring that the slots 4 in the laminated core 3a have a predetermined width and a correct pitch. At the same time, the inside-diameter shaping mandrel 22 cooperates with the a slot alignment mandrel 23 in adjusting radial misalignment of the helical turns of the laminated core 3a to the extent that an inner peripheral surface of the laminated core 3a has a desired level of roundness.

Figure 3D:
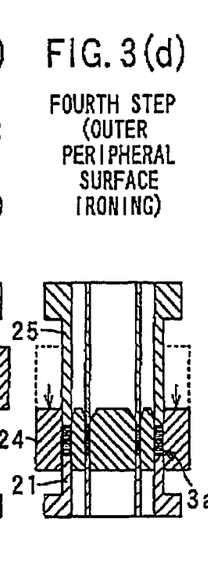

A fourth step of the finishing process is an outer peripheral surface ironing step (FIG. 3(d)) in which the outside-diameter ironing ring 24 is driven by the non-illustrated drive means to slide downward on and along an outer peripheral surface of the cylindrical presser member 25 to perform an ironing operation. In this instance, since the inside diameter of the outside-diameter ironing ring 24 is set to be slightly smaller than the outside diameter of the laminated core 3a, there is provided an appropriate ironing depth corresponding to the difference in diameter between the ironing ring 24 and the laminated core 3a. With the ironing depth thus provided, the outer peripheral surface of the laminated core 3a, which is formed jointly by outer peripheral surfaces of the helical turns or layers of the strip 11, undergoes plastic deformation as it is squeezed in a radial inward direction by the ironing ring 24 during the ironing operation. When the ironing ring 24 reaches its predetermined lowermost position, ironing of the outer peripheral surface of the laminated core 3a is completed.

Figure 3E:
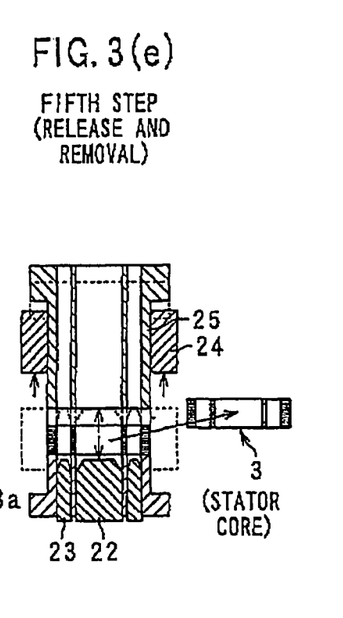

A fifth step of the finishing process is a release and removal step (FIG. 3(e)) in which the outside-diameter ironing ring 24, the inside-diameter shaping mandrel 22, the slot alignment mandrel 23, and the presser member 25 are driven in the reverse direction to return to their original positions, so that the shaped laminated core 3a is fully released from restraint and can be removed from the ironing apparatus 20. An ironing-finished stator core 3 is thus produced.

By virtue of the finishing process just described above, the stator core 3 has sots and an axial hole shaped into a desired form and the outer peripheral surface of the stator core 3 has a desired level of accuracy in terms of roundness, concentricity with respect to the axial hole, and perpendicularity.

The four working processes described above with reference to FIGS. 2 and 3(a)-3(e) are substantially the same as those used in a conventional stator core manufacturing method so far as the processing flow or sequence is concerned. More specifically, in the winding process, the press-worked strip 11 is wound in a spiral fashion so as to form a cylindrical core having a helical plural turns while an outer edge portion 6 of the strip 11 is thinned and extended in the longitudinal direction by a pair of forming rollers to thereby provide a longer winding circumferential length. The thus produced cylindrical core necessarily has a wedge-shaped gap or clearance produced between the thinned or rolled outer edge portions of two adjacent turns or layers of the laminated core.

Due to the presence of the wedge-shaped clearance, a force or pressure acting on the outer edges of the turns of the cylindrical core during ironing operation is partially reduced or otherwise absorbed although the amount of loss in ironing pressure depends on the amount of ironing depth. In the case where the tams or layers of the laminated core are largely displaced from one another in the radial direction, it is very difficult to securely restrain the core at the outer edge portion thereof hindering smooth ironing operation and promoting a distortion occurring at the outer edge portion of the core by ironing. The outer edge distortion will enlarge the wedge-shaped clearance between the adjacent turns or layers of the core and eventually deteriorates the strength properties of the core.

According to one important feature of the manufacturing method of the present invention, the winding process for producing a laminated core 3a makes use of a unique winding process, which is able to prevent both the generation of a crack in a core-back part 5 of the steel sheet strip 11 and the occurrence of a gap or clearance between two adjacent turns or layers of the laminated core 3a. The use of the unique winding process ensures that an ironing process can be performed smoothly and a stator core with excellent strength properties can be produced. The unique winding process and a stator core 3 produced by using the same will be described below in greater detail in conjunction with a preferred embodiment of the invention shown in FIGS. 4(a) to 4(e) and FIGS. 5(a) to 5(c).

Figure 4A:
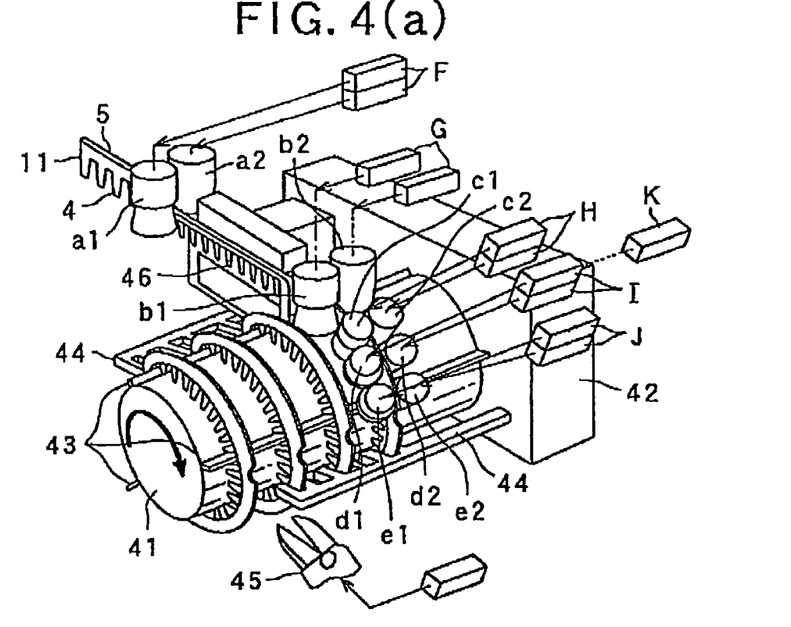
FIG. 4(a) is a perspective view showing a winding apparatus used in a winding process according to the stator core manufacturing method of the present invention.
Figure 4B:
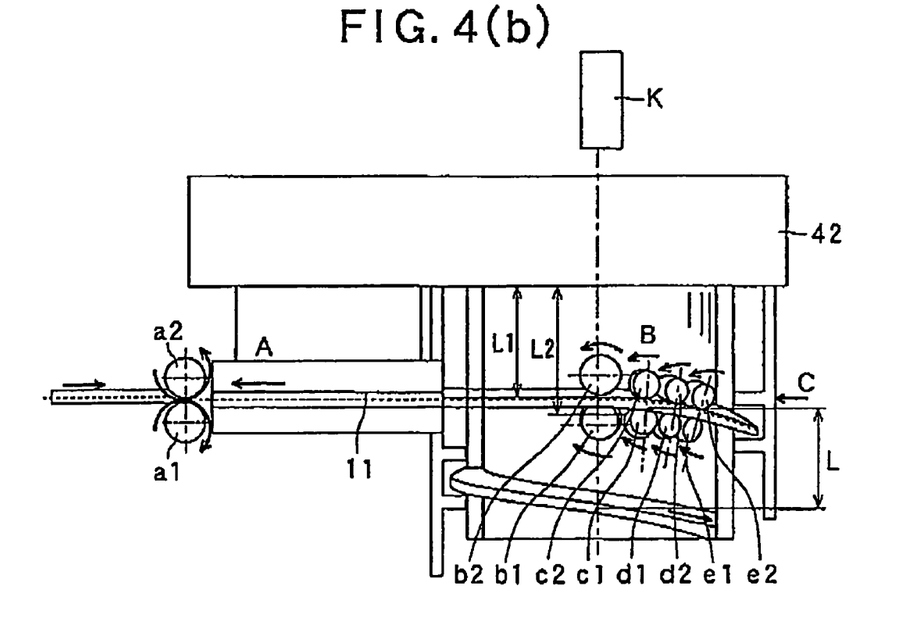
FIG. 4(b) is a plan view of the winding apparatus.

As shown in FIGS. 4(a) and 4(b), a strip 11 of steel sheet having slots 4 press-formed at regular intervals along one edge thereof and a core-back part 5 formed along the other edge thereof is fed into a winding apparatus where the strip 11 is subjected to three consecutive rolling processes performed respectively by a first pair of forming rollers 1a and 1b, a second pair of forming rollers 2a and 2b, and a plurality (three in the illustrated embodiment) of pairs of forming rollers c1 and c2, d1 and d2, and e1 and e2.

Figure 4C:
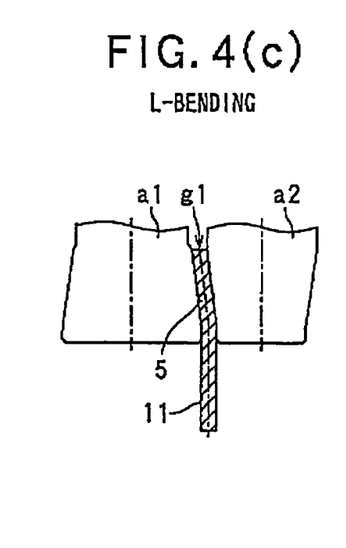
FIG. 4(c) is an enlarged view of a portion of the winding apparatus looking in the direction of the arrow A shown in FIG. 4(b)

The first pair of forming rollers a1 and a2 is disposed at an upstream end of the feed path. As shown in FIG. 4(c), one roller a1 of the first pair of forming rollers is a reverse tapered roller and the other roller a2 is a tapered roller. The reverse tapered roller a1 and the tapered roller a2 have the same cone angle and define therebetween a uniform gap g1. The reverse tapered roller a1 and the tapered roller a2 are disposed side by side or in lateral juxtaposition with their axes disposed vertically. These rollers a1 and a2 are supported such that they are rotatable about their own axes.

Figure 4D:
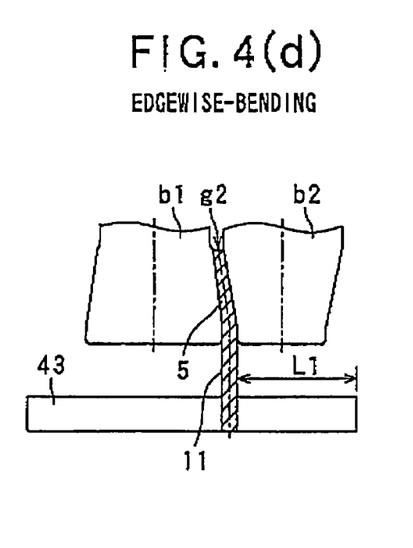
FIG. 4(d) is an enlarged view of a portion of the winding apparatus looking in the direction of the arrow B shown in FIG. 4(b)

The second pair of forming rollers b1 and b2 is disposed downstream of the first pair of forming rollers a1 and a2 at a position located directly above an axis of a winding drum 41. As shown in FIG. 4(d), one roller b1 of the second pair of forming rollers is a reverse tapered roller and the other roller b2 is a tapered roller. The tapered roller b2 has a cone angle larger than a cone angle of the reverse tapered roller b1 so that these rollers b1 and b2 define therebetween a wedge-shaped gap g2. The gap g2 has a varying width reducing gradually in an upward direction. The reverse tapered roller b1 and the tapered roller b2 are also disposed side by side or in lateral juxtaposition with their axes disposed vertically. These rollers b1, b2 are supported such that they are rotatable about their own axes.

Figure 4E:
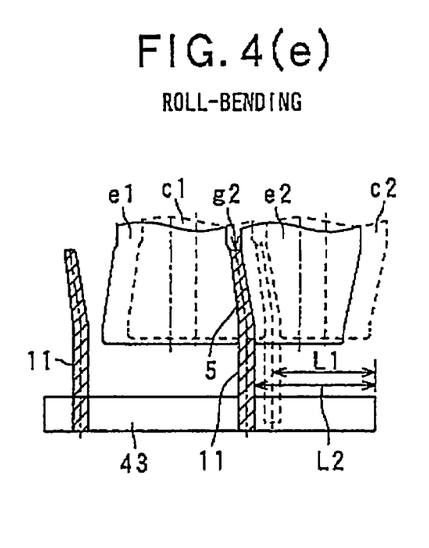
FIG. 4(e) is an enlarged view of a portion of the winding apparatus looking in the direction of the arrow C shown in FIG. 4(b)

The third to fifth pairs of forming rollers c1 and c2, d1 and d2, and e1 and e2 are arranged in a row with the third pair of forming rollers c1, c2 disposed immediately downstream of the second pair of forming rollers b1, b2. The row of forming roller pairs c1 and c2, d1 and d2, and e1 and e2 extends along a spiral or helical line drawn by, for example, a screw thread formed on the winding drum 41. The helical line skews in a thickness direction of the strip 11 (downward direction in FIG. 4(b)). As shown in FIG. 4(e), one roller c1 of the third pair of forming rollers is a reverse tapered roller and the other roller c1 is a tapered roller. Similarly, as shown in FIGS. 4(a) and 4(b), one roller d1 of the fourth pair of forming rollers, which is disposed immediately downstream of the third pair of forming rollers c1 and c2, is a reverse tapered roller and the other roller d2 is a tapered roller. One roller e1 of the fifth pair of forming rollers is a reverse tapered roller and the other roller e2 is a tapered roller. The tapered rollers c2, d2, e2 have a cone angle larger than a cone angle of the reverse tapered rollers c1, d1, e1 so that a wedge-shaped gap g2 is defined between each one of the third to fifth pairs of forming rollers c1 and c2, d1 and d2, and e1 and e2. The reverse tapered roller c1, d1, e1 and the tapered roller c2, d2, e2 in each roller pair are disposed side by side and arranged in a radial direction as viewed from the axis, of the winding drum 41. These rollers c1, c2, d1, d2, e1, e2 are supported such that they are rotatable about their own axes, which are aligned with normal lines of the cylindrical surface of the winding drum 41.

As shown in FIG. 4(b), the third to fifth pairs of forming rollers c1 and c2, d1 and d2, and e1 and e2 constitute a three-stage rolling mechanism in which the positions of apparent rotation centers of the respective pairs of forming rollers c1 and c2, d1 and d2, e1 and e2 (which can be represented by the positions of nips formed between the respective pairs of forming rollers) are offset from one another in an appropriate manner so that the strip 11, as it is sent out from the three-stage rolling mechanism, has a curvature warping in a thickness direction thereof away from an imaginary straight line extending from the second pair of forming rollers b1, b2 to the third pair of forming rollers c1, c2 located at an inlet of the three-stage rolling mechanism.

The individual rollers a1 and a2, b1 and b2, e1 and c2, d1 and d2, and e1 and e2 in each respective roller pair are separately driven in rotation by an associated one of the respective pair of roller control units F, G, H, I and J while, at the same time, they are operated by the roller control units F-J to exert a predetermined rolling pressure or force (plastic deformation force) onto the strip 11 of steel sheet being formed. In other words, each individual roller (e.g. a1) is driven by a dedicated roller control unit (e.g. for a1, one of the pair of control units F). With this arrangement, it is possible to perform in succession an L-bending process in which the core-back part 5 of the strip 11 is bent at an acute angle to a general plane of the strip 11 by means of the first pair of forming rollers a1 and a2, an edgewise-bending process in which the core-back part 5 of the strip 11 is bent edgewise (or in a widthwise direction of the strip 11) by means of the second pair of forming rollers b1 and b2, and a roll-bending process in which the core-back part 5 of the strip 11 is bent to warp in a thickness direction of the strip 11 by means of the third to fifth pairs of forming rollers c1 and c2, d1 and d2, and e1 and e2.

The winding drum 41 is disposed below the first to fifth pairs of forming rollers a1 and a2, b1 and b2, c1 and c2, d1 and d2, and e1 and e2 with its axis disposed horizontally. The winding drum 41 is rotatably supported on a unit base 42 in a cantilevered fashion and rotationally driven by a winding drum control unit K. A bent portion of the strip 11, which has been subjected to the aforesaid three bending processes, is wound on the winding drum 41. The winding drum 41 has a plurality (three in the illustrated embodiment) of axially extending positioning guides 43, which project radially outward from a peripheral surface of the winding drum 41 and are spaced in a circumferential direction of the winding drum 41 at equal angular intervals. Each of the positioning guides 43 is engageable with one of the slots 4 of the strip 11 and rotates with the winding drum 41 when the bent portion of the strip 11 is wound. Thus, the positioning guides 43 align the slots 4 in the axial direction and also assist the pairs of forming rollers a1 and a2, b1 and b2, c1 and c2, d1 and d2, and e1 and e2 to send out or carry the bent portion of the strip 11 during rolling operation.

A pair of strip feed guides 44 is disposed in a mirror image manner at opposite positions around the winding drum 41. The strip feed guides 44 are fixed at one end to the unit base 42 and guide the strip 11 in such a manner that the bent portion of the strip 11 can be wound smoothly in a spiral fashion on the winding drum 41 while keeping a predetermined lead L (FIG. 4(b)) between two adjacent helical turns of the bent portion of the strip 11. When a predetermined number of turns or layers of the helically formed portions are wound by the winding drum 41, a strip cutter 45 is operated by a cutter control unit M to cut the strip 11.

The winding apparatus of the foregoing construction will operate as described below. The first to fifth pairs of rollers a1 and a2, by and b2, c1 and c2, d1 and d2, and e1 and e2 and the winding drum 41 are driven independently to rotate at given speeds. A leading end portion of the press-worked steel sheet strip 11 is inserted into a uniform gap g1 defined between the first pair of forming rollers (i.e., the reverse tapered roller 1a and the tapered roller 1b), as shown in FIG. 4(c). This causes a core-back part 5 of the leading end portion of the strip 11 to bend in a lateral outward direction (leftward direction in FIG. 4(c)) of the strip 11 at an angle corresponding to the cone angle of the rollers a1, a2. An L-bending operation is thus completed.

Then, while being guided by a linear strip guide 46 (FIG. 4(a)), the leading end portion including the L-bent core-back part 5 of the strip 11 is inserted in a wedge-shaped gap g2 defined between the second pair of forming rollers (i.e., the reverse tapered roller b1 and the tapered roller b2), as shown in FIG. 4(d). In this instance, since the rollers b1 and b2 are operated to narrow the wedge-shaped gap g2 to thereby exert a rolling pressure or force on the L-bent core-back part 5 of the strip 11, the core-back part 5 is formed thinner as it approaches an outer edge opposite the slotted or otherwise toothed inner edge of the strip 11. The formed leading end portion of the strip 11 is continuously sent out from the pair of rollers b1 and b2 by rotation. In this instance, since the core-back part 5 of the strip 11 is thinned and extended in the longitudinal direction thereof the formed leading end portion of the strip 11 bends edgewise into an arc with the toothed inner edge of the strip 11 being in contact with the peripheral surface of the winding drum 41. An edgewise-bending operation is thus completed.

Subsequently, the thus formed leading end portion of the strip 11 is introduced into the three-stage rolling mechanism where the formed strip leading end is inserted successively in the wedge-shaped gap g2 defined between the third pair of foxing rollers c1 and c2, the wedge-shaped gap g2 defined between the fourth pair of forming rollers d1 and d2, and the wedge-shaped gap g2 defined between the fifth pair of forming rollers e1 and e2. In this instance, since the axes of rotation of the third to fifth pairs of forming rollers c1 and c2, d1 and d2, and e1 and e2 are offset from one another in such a manner so that the amount of offset gradually increase in an advancing direction of the strip f1, as shown in FIG. 4(b), the formed leading end portion of the strip 11 bends into a curvature warping in a thickness direction of the strip 11 away from an imaginary straight line extending from the second pair of forming rollers c1, c2 and the third pair of forming rollers c1, c2 forming the inlet of the three-stage rolling mechanism. Thus formed curvature will form a lead L in the axial direction of the winding drum 41 when the formed portion of the strip 11 is helically wound on the winding drum 41. A roll-bending operation is thus completed.

As shown in FIG. 4(b), the amount of offset between the third pair of forming rollers c1 and c2 and the fifth pair of forming rollers e1 and e2 is represented by the difference between the distance L1 from a reference end face of the unit base 42 to a part of the strip 17 being rolled by the third part of forming rollers c1, c2 and the distance L2 from the reference end face of the unit base 42 to a part of the strip 17 being rolled by the fifth pair of forming rollers e1, e2. The amount of offset (L2-L1) is determined such that the spirally bent portion of the strip 17 will advance by the distance or lead L in one complete turn of the drum 41. The use of the three-stage roiling mechanism is not a major requirement for providing the lead L according to the present invention. The same lead L can be also obtained by using a single wedge-shaped gap having a greater angle of inclination than the wedge-shaped gap g2 shown in FIG. 4(e). A reverse tapered roller having a larger cone angle than the reverse taper rollers c1, d1, e1 and a tapered roller having a larger cone angle than the tapered rollers c2, d2, e2 are used in combination to define such wedge-shaped gap having a greater inclination angle.

The first pair of forming rollers a1 and a, the second pair of forming rollers b1 and b2, and the third to fifth pairs of forming rollers c1-e1 and c2-e2 may be arranged in an order or sequence different from the order used in the illustrated embodiment. For example, the second pair of forming rollers b1, b2 may be disposed upstream of the first pair of forming rollers a1, a2 and the third to fifth pairs of forming rollers c1-e1 and c2-e2, and the first pair of forming rollers a1, a2 is disposed intermediately between the second pair of forming rollers b1, b2 and the third pair of forming rollers c1, c2 so that the edgewise-bending process is performed first, followed by the L-bending process. In such instance, however, the second pair of forming rollers b1, b2 should be replaced by a pair of tapered rollers, which defines a wedge-shaped gap free of inclination.

When a predetermined number of turns or layers of the helically formed portions are wound by the winding drum 41, operation of the winding drum 41 is stopped and the strip cutter 45 is driven to advance toward the helically formed portions of the strip 11 and cut the strip 11 at a predetermined position. Then the helically formed portions, which have been cut off from the strip 11, are brought together by compression in the axial direction and finally removed from the winding drum 41 as a laminated core 3a.

Figures 5A, 5B, 5C:
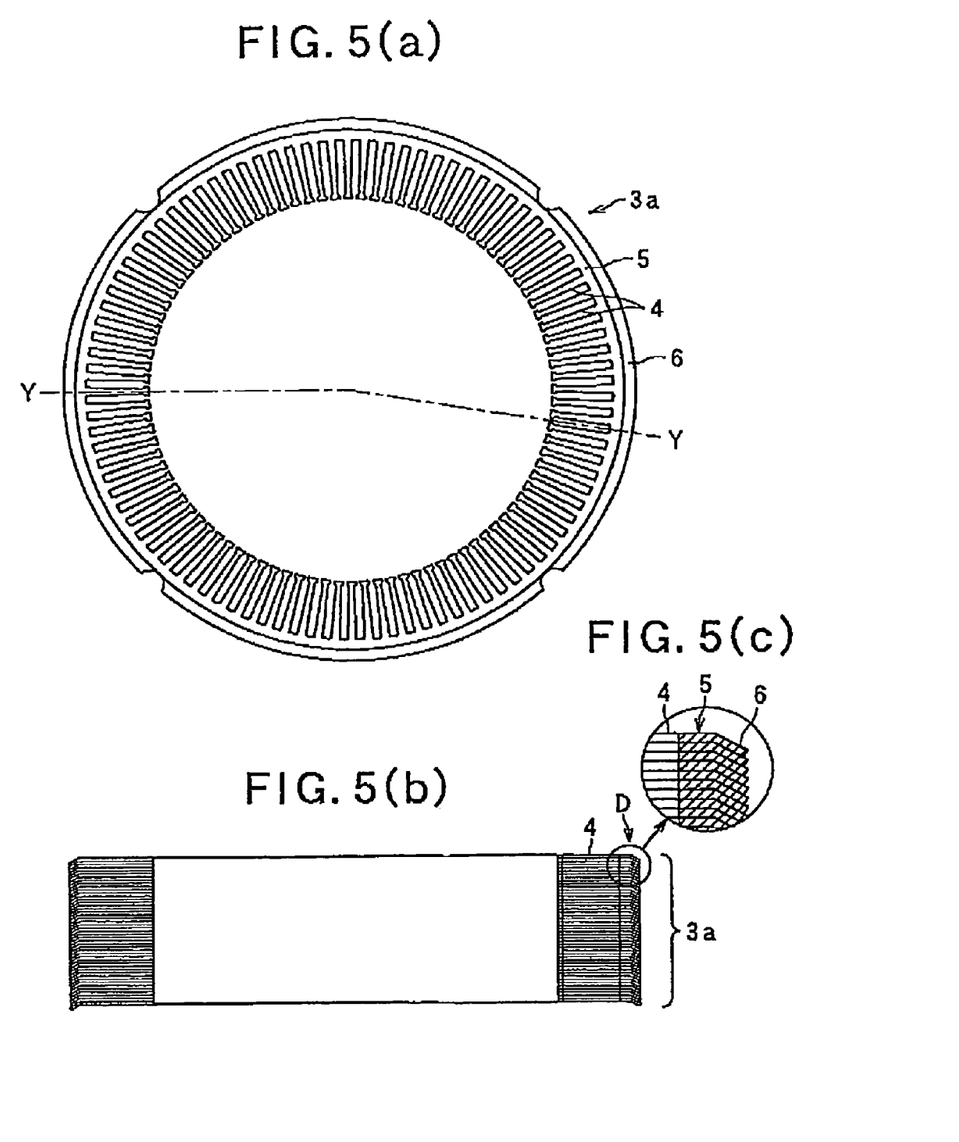
FIG. 5(a) is a plan view of a stator core manufactured in accordance of the present invention.
FIG. 5(b) is a cross-sectional view taken along line Y-Y of FIG. 5(a)
FIG. 5(c) is an enlarged view of a portion of the stator core in a circle D shown in FIG. 5(b).

As shown in FIGS. 5(a) to 5(c), the laminated core 3a has a plurality of helical turns or layers each having a core-back part 5 including an outer edge portion 6 bent or tilted in a thickness direction of the layer (axial direction of the core). The bent outer edge portions 6 of the helical layers are aligned and stacked together to form a structure which is able to prevent the generation of an interlayer gap or clearance at such outer edge portions 6.

As thus far described, the manufacturing method for a stator core 3 according to the illustrated embodiment of the present invention has a winding process, which includes an L-bending process in which an outer edge portion 6 of a steel sheet strip 11 is bent at an angle to a general plane of the strip 11, an edgewise-bending process in which the outer edge portion 6 of the strip 11 is bent edgewise into an arc, and a roll-bending process in which the outer edge portion 6 of the strip 11 is bent into a curvature warping in a thickness direction of the strip 11, wherein the L-bending process, the edgewise-bending process and the roll-bending process are performed successively in a predetermined sequence, followed by a helical winding process in which the strip 11 is helically and closely wound so as to form a cylindrical helically wound or laminated stator core 3a.

With the outer edge portion 6 of the strip 11 bent at an angle to the general plane of the strip 11, the core is allowed to have a smaller outside diameter and a circumferential distortion of the outer edge portion becomes smaller than that of the flat unbent outer edge portion of the conventional core with the result that a crack at an outer periphery of the core is unlikely to occur. Furthermore, since the bending of the strip 11 in a thickness direction thereof requires a small bending area and involves a small wowing distortion as compared to the bending of the strip in a direction along the surface, combined use of such bending in the thickness direction is able to reduce a circumferential distortion of the core to a level much smaller than that of the conventional core, allowing for a rolling operation performed on the strip outer edge portion with a small rolling reduction. By thus limiting the rolling reduction, it is possible to suppress the occurrence of an interlayer gap or clearance at the outer edge portion 6 of the laminated core 3a.

Furthermore, the rolling or thinning process with small rolling reduction does not increase the magnetic resistance the steel sheet strip and, hence, the steel sheet strip is allowed to possess a good magnetic permeability. Accordingly, power reduction of the stator core does not take place. From a strength standpoint, there is no risk of lowering the clamp-holding force at the core-back part 5 of the stator core 3 when the stator core 3 and front and rear frames 9 are clamped in sandwiched relation by means of through-bolts 8. Furthermore, the outer peripheral surface of the core is free from crack and this will increase the strength of the core.

In the embodiment described above, a stator core 3 for a rotating electrical machine and a method of manufacturing such stator core according to the present invention is embodied in a vehicle alternator. The invention should by no means be limited in application to the illustrated embodiment bat may be applied to another rotating electrical machine having a similar stator core, such as high-voltage drive motor.

Obviously, various minor changes and modifications are possible in the light of the above teaching. It is to be understood that within the scope of the appended claims the present invention may be practiced otherwise than as specifically described.

What is claimed is:

1. A stator core for a rotating electrical machine comprising:
    a generally cylindrical core having a helical plurality of turns formed from a strip of steel sheet having a plurality of spaced magnetic pole teeth press-formed along a first edge thereof, wherein a second edge of the strip opposite the toothed first edge is inclined at an angle to a plane normal to an axis of the cylindrical core, the second edge of the strip being bent edgewise into an arc with the toothed first edge of the strip being radially inside, the second edge of the strip being bent into a curve warping in a thickness direction of the strip, each layer of helically turned steel sheet having the same bend angle, and a perimeter portion becomes thinner than other portions in the helical core.

2. The stator core for a rotating electrical machine according to claim 1, wherein
said second edge of the strip is free from cracks.

3. A method of manufacturing a stator core for a rotating electrical machine of claim 1, comprising:

a press-working process in which a strip of steel plate is press-worked to have a plurality of magnetic pole teeth formed along a first edge thereof;

a winding process in which the press-worked strip is thinned at a second edge thereof opposite the toothed first edge and wound in a spiral fashion with the toothed first edge being radially inside so as to form a generally cylindrical core having a helical plurality of turns;

a welding process in which the helical turns of the cylindrical core are aligned in radial and circumferential directions and the aligned helical turns are welded together at the second edge of the strip; and a finishing process in which an outer peripheral surface of the cylindrical core, which is formed jointly by outer peripheral surfaces of the welded turns of the cylindrical core, is shaped by ironing into a predetermined configuration, wherein said winding process comprises:

an L-bending process in which the second edge of the strip is bent at an angle to a general plane of the strip;

an edgewise-bending process in which the second edge of the strip is bent edgewise into an arc with the toothed first edge of the strip being radially inside; and a roll-bending process in which the second edge of the strip is bent into a curvature warping in a thickness direction of the strip, and wherein said L-bending process, said edgewise-bending process and said roll-bending process are performed successively in a predetermined sequence before the strip is wound in a spiral fashion with the toothed first edge of the strip being radially inside to thereby form said cylindrical core.

4. The method as defined in claim 3, wherein said L-bending process, said edgewise-bending process and said roll-bending process are performed in the named order.

5. The method as defined in claim 3, wherein said edgewise-bending process is performed before said L-bending process and said roll-bending process, and said L-bending process is performed between said edgewise-bending process and said roll-bending process.

6. The method as defined in claim 3, wherein said L-bending process is carried out by rolling the second edge of the strip by a pair of rollers, one of said pair of rollers being a tapered roller and the other being a reverse tapered roller, the tapered roller and the reverse tapered roller having the same cone angle and defining therebetween a uniform gap, the gap being inclined at an angle to a plane parallel to axes of the tapered and reverse tapered rollers.

7. The method as defined in claim 3, wherein said edgewise-bending process is carried out by rolling the second edge of the strip by a pair of rollers, said pair of rollers defining therebetween a wedge-shaped gap having a varying width reducing gradually as it approaches an end extremity of the second edge of the strip.

8. The method as defined in claim 7, wherein one of said pair of rollers is a tapered roller and the other is a reverse tapered roller, the tapered roller having a cone angle larger than a cone angle of the reverse tapered roller, the wedge-shaped gap defined between the tapered roller and the reverse tapered roller being inclined at an angle to a plane parallel to axes of the tapered and reverse tapered rollers.

9. The method as defined in claim 3, wherein said roll-bending process is carried out by rolling the second edge of the strip by a plurality of pairs of rollers arrayed in a row in a longitudinal direction of the strip, said arrayed plurality of pairs of rollers being offset from one another such that the amount of offset between two adjacent pairs of rollers of said arrayed plurality of rollers becomes greater in an advancing direction of the strip, one of each pair of rollers of said plurality of rollers being a tapered roller and the other being a reverse tapered roller, the tapered roller having a cone angle larger than a cone angle of the reverse tapered roller, the tapered roller and the reverse tapered roller defining therebetween a wedge-shaped gap having a varying width reducing gradually as it approaches an end extremity of the second edge of the strip, the wedge-shaped gap being inclined at an angle to a plane parallel to axes of the tapered and reverse tapered rollers.

* * * * *